(12) United States Patent
Gantenbein et al.

(10) Patent No.: US 8,625,463 B2
(45) Date of Patent: Jan. 7, 2014

(54) METHOD AND APPARATUS FOR DISCOVERY AND TRACKING OF LOCATION OF NETWORKED DEVICES

(75) Inventors: Dieter Gantenbein, Adliswil (CH); Michel J. Zedler, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 12/052,068

(22) Filed: Mar. 20, 2008

(65) Prior Publication Data

US 2009/0238079 A1 Sep. 24, 2009

(51) Int. Cl.
 *H04L 12/28* (2006.01)
(52) U.S. Cl.
 USPC .............. 370/255; 370/400; 370/408
(58) Field of Classification Search
 None
 See application file for complete search history.

(56) References Cited

U.S. PATENT DOCUMENTS

| | | | | |
|---|---|---|---|---|
| 6,665,715 | B1 * | 12/2003 | Houri | 709/223 |
| 7,822,426 | B1 * | 10/2010 | Wuersch | 455/456.1 |
| 2005/0018645 | A1 * | 1/2005 | Mustonen et al. | 370/349 |
| 2006/0039300 | A1 * | 2/2006 | Ogier et al. | 370/254 |
| 2008/0031241 | A1 * | 2/2008 | Toebes et al. | 370/389 |
| 2008/0154542 | A1 * | 6/2008 | Hsyu et al. | 702/181 |
| 2008/0186234 | A1 * | 8/2008 | Alles et al. | 342/451 |
| 2010/0020776 | A1 * | 1/2010 | Youssef et al. | 370/338 |

OTHER PUBLICATIONS

P. Bahl et al., "RADAR: An In-Building RF-Based User Location and Tracking System," in Proceedings of IEEE INFOCOM, Mar. 2000, pp. 775-784.

J.A. Muir et al., "Internet Geolocation and Evasion," Carleton University, School of Computer Science, Tech. Rep. TR-06-05, Apr. 2006, pp. 1-22.

R. Want et al., "Ubiquitous Electronic Tagging," IEEE Distributed Systems Online, Sep. 2000, pp. 1-10, vol. 1, No. 2.

The AIDA/IDD Project website, IBM Zurich Research Laboratory, [Online], Available: http://www.zurich.ibm.com/csc/idd, 2008, 1 page.

L.M. Ni et al., "LANDMARC: Indoor Location Sensing Using Active RFID," in Proceedings of the Pervasive Computing and Communications Conference 2003, pp. 407-415.

"RFID Data Center Resource Management from IBM," [Online], Available: http://www-03.ibm.com/solutions/businesssolutions/sensors/doc/content/solution/3373364129.html, 2008, 2 pages.

J. Hightower et al., "A Survey and Taxonomy of Location Systems for Ubiquitous Computing," University of Washington, Technical Report UW-CSE 01-08-03, Aug. 2001, pp. 1-29.

V.N. Padmanabhan et al., "An Investigation of Geographic Mapping Techniques for Internet Hosts," in Proceedings of ACM SIGCOMM, Aug. 2001, pp. 173-185.

(Continued)

*Primary Examiner* — Chirag Shah
*Assistant Examiner* — Daniel Mitchell
(74) *Attorney, Agent, or Firm* — Daniel P. Morris; Ryan, Mason & Lewis, LLP (57) ABSTRACT

Techniques are disclosed for discovery and tracking of locations of devices attached to a computing system network. By way of example, an automated method for determining a location of a target element in a distributed network includes the following steps. One or more locations of one or more sample topology elements in the distributed network are learned. Location mappings are generated, the location mappings representing associations between the learned locations of the one or more sample topology elements and one or more network attributes. A location of a target element is estimated using the location mappings.

18 Claims, 7 Drawing Sheets

(56) References Cited

OTHER PUBLICATIONS

E. Katz-Bassett et al., "Towards IP Geolocation Using Delay and Topology Measurements," in Proceedings of ACM SIGCOMM Conference on Internet Measuring, Oct. 2006, pp. 71-84.

A. Ziviani et al., "Improving the Accuracy of Measurement-Based Geographic Location of Internet Hosts," Computer Networks, Mar. 2005, pp. 503-523, vol. 47, No. 4.

H. Lim et al., "Constructing Internet Coordinate System Based on Delay Measurement," in Proceedings of ACM SIGCOMM Conference on Internet Measurement, Oct. 2003, pp. 129-142.

P. Bahl et al., "Enhancements to the RADAR User Location and Tracking System," Microsoft Research, Technical Report MSR-TR-2000-12, Feb. 2000, pp. 1-13.

Cisco Systems, "Wi-Fi Based Real-Time Location Tracking: Solutions and Technology," [Online], Available: http://www.cisco.com/en/US/prod/collateral/wireless/ps5755/ps6301/ps6386/prod_white_paper0900aecd80477957.pdf, Apr. 2006, 6 pages.

Skyhook Wireless, Inc."IPhone Skyhook Wireless Positioning," [Online], Available: http://www.skyhookwireless.com/howitworks/, 2008, 2 pages.

S. Gandhi, "Discover Location Awareness in IBM Lotus Sametime V7.5," [Online], Available: http://www-128.ibm.com/developerworks/lotus/library/location-awareness/, Sep. 2006, 9 pages.

I.H. Witten et al., "Data Mining: Practical Machine Learning Tools and Techniques with Java Implementations," Morgan Kaufmann Publishers, 2000, 2 pages.

Cisco Systems, "How to Get Dynamic CAM Entries (CAM Table) for Catalyst Switches Using SNMP," [Online], Available: http://www.cisco.com/warp/public/477/SNMP/cam_snmp.html, Jul. 2007, 8 pages.

M. Zedler, "Enterprise IT Assets Location Discovery and Tracking," Master's thesis, HdM Stuttgart, University of Applied Sciences, Oct. 2007, pp. 1-93.

B. Jacob et al., "IBM Tivoli Application Dependency Discovery Manager Capabilities and Best Practices," IBM, [Online], Available: http://www.redbooks.ibm.com/redpieces/pdfs/sg247519.pdf, Feb. 2008, pp. 1-22.

\* cited by examiner

ESTIMATION STEP – AT TIME t3

LEGEND:
top*: TOPOLOGY ELEMENT
n*: HOST NETWORK ATTRIBUTE
loc: PHYSICAL LOCATION (loc_guess, conf_guess) = SLV((loc3, conf1), (loc1, conf2))

| ESTIMATE TARGET DEVICE LOCATION |
|---|
| Input: $T_t$, the set of topology elements associated to the target device in the CM |
| 1: for all $S_t \in P(T_t)$ do |
| 2:    for all Example $e \in E$ do |
| 3:       if $T_t \subseteq T_e$ then |
| 4:          Increment counter *coverageCount* |
| 5:          for all $\lambda \in L_e$ do |
| 6:             increment counter *locCount* for $\lambda$ |
| 7:          end for |
| 8:       end if |
| 9:    end for |
| 10: end for |
| 11: for all location $\lambda \in \Lambda$ do |
| 12:    Create rule r: $S_t \Rightarrow \lambda$ with $cov(r_\lambda)$ and $acc(r_\lambda)$ using *coverageCount* and *locCount* |
| 13:    Compute the aggregated accuracy $agg(G)$ and store as tuple $(S_t, G, agg(G))$ |
| 14: end for |
| 15: Determine $tuple_{pick}$ $(S_t, G, agg(G))$ with the total highest aggregated accuracy $agg(G)$ |
| 16: Return the location estimation set $RES : \{G \mid G$ in tuple $(S_t, G, agg(G)) \wedge S_t$ in tuple $(S_t, G, agg(G))$ equals $S_t$ in $tuple_{pick}\}$ |

FIG. 5

METHOD AND APPARATUS FOR DISCOVERY AND TRACKING OF LOCATION OF NETWORKED DEVICES

FIELD OF THE INVENTION

The present invention relates to computing system networks and, more particularly, to techniques for discovery and tracking of locations of devices attached to the computing system network.

BACKGROUND OF THE INVENTION

A main goal of enterprise systems management is to provide reliable, secure and efficient information technology (IT) services to support business operations. Knowing the actual currently implemented state of IT assets (including, for example, networked servers, workstations, printers and other mobile devices), including their presence, configuration, vulnerabilities and dependencies is a cornerstone to proactive infrastructure planning and control. Hence, considerable effort is put into maintaining accurate documentation of this knowledge. However, the size of large enterprise IT infrastructures and changing business requirements have ever been challenging the efficiency of manual change tracking processes.

Although the physical location of IT assets is crucial for system administration, financial accounting and IT estate insight, any information on physical location information is typically encapsulated within Transmission Control Protocol/Internet Protocol (TCP/IP) application protocols and thus non-trivial to discover. Hence today, the physical location of IT assets is often manually maintained in inventory catalogs that are updated through help-desk/desk-side and server-room manual change tracking, complemented with periodic wall-to-wall inventory processes.

However, the efficiency of such processes is challenged in large scale enterprise environments particularly with respect to the omission of documentation updates, increasing workstation mobility, distributed enterprise facilities, virtualization, multiple administrative domains and restricted facility access. These problems typically lead to incomplete or outdated information and further render inventory efforts tedious and costly.

Whilst radio frequency identification (RFID) sensor network solutions have been proposed to automate IT asset location tracking in the past, these approaches require extensive sensor infrastructure to be installed to cover enterprise facilities. Moreover, they rely on the instrumentation of target devices with receiver/emitter hardware which limits the localization scope to authorized devices.

An alternative proposal is to leverage existing wireless local area network (WLAN) infrastructure and use signal characteristics of in-place wireless network interface cards for positioning (see, e.g., P. Bahl and V. Padmanabhan, "RADAR: an in-building RF-based user location and tracking system" in Proceedings of IEEE INFOCOM, Tel-Aviv, Israel, 2000). The latter approach does not necessarily require target device instrumentation, but localization scope is limited to devices that have the required hardware and actually connect to the wireless network.

For global geo-location of Internet hosts, a number of network centric solutions have been proposed and evaluated (see, e.g., J. A. Muir and P. van Oorschot, "Internet geolocation and evasion" Carleton University, School of Computer Science, Ottawa, ON, Canada, Tech. Rep. TR-06-05, 2006). However, these techniques yield a location granularity which may, at its best, provide for the identification of an enterprise campus. Operating on logical IP addresses, they are not capable of actually identifying a located entity.

For large heterogeneous enterprise environments, we consider the above-mentioned alternatives valid only for certain administrative subdomains but either not feasible or not providing enough coverage or precision at the global level. We observe that, in spite of its business potential, an industry applicable solution to automate the physical location discovery of enterprise IT assets is lacking. Particularly, current processes are incapable of providing up-to-date location meta-data of sufficient granularity and in an appropriate spatial reference system, whereas proposed automations either require target device instrumentation and thus neglect unauthorized devices or rely on wireless access and thus neglect other network access methods.

SUMMARY OF THE INVENTION

Principles of the invention provide techniques for discovery and tracking of locations of devices attached to a computing system network. Locations may be physical or logical.

By way of example, a first embodiment includes an automated method for determining a location of a target element in a distributed network including the following steps. One or more locations of one or more sample topology elements in the distributed network are learned. Location mappings are generated, the location mappings representing associations between the learned locations of the one or more sample topology elements and one or more network attributes. A location of a target element is estimated using the location mappings.

The location learning step may be performed in accordance with one or more network monitoring techniques. The one or more network monitoring techniques may include capturing location knowledge using one or more of: (i) a physical inventory; (ii) a demographic declaration; and (iii) a behavioral pattern.

The location mappings generating step may further include computing respective location confidence measures for a sample topology element that has more than one location. When the sample topology element has more than one location, the location with the highest confidence measure is selected as the learned location of the sample topology element.

The estimating step may further include determining the existence of an association between the target element and at least one of the sample topology elements, and identifying the location of the sample topology element as the location of the target element associated therewith based on a confidence measure computed for the location of the sample topology element.

The learning, generating and estimating steps may be performed interweaved concurrently.

The learned locations of the sample topology elements and the estimated location of the target element may be represented by a spatial hierarchical structure. The spatial hierarchical structure enables evaluation of location determination on different levels of granularity.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be evident, illustrative embodiments of the invention propose adaptive learning techniques on spatial hierarchies for use in estimating target device location in a network. That is, we propose a system and methodology to estimate the physical location of network attached (i.e., networked) devices from adaptively acquired local area network topology connaissance.

This system and methodology are based on the principle that once we know the physical location of an exemplary device which is associated with a fixed network topology element (the simplest example is being connected to a particular switch port), we can make assumptions on the location of any device that is associated with the same topology element. Generalized, we consider any observable associations between target devices and fixed topology elements (including, for example, physical switches, routers and wireless access points as well as logical subnets and domains) for location estimation. With these topology elements, we combine the known locations of arbitrary (sample) devices, in order to identify the best topology elements that qualify for location estimation. The system can consequently then be used to derive the location of arbitrary target devices (including, for example, networked servers, printers, workstations, mobile devices and virtual machines).

A major advantage of our solution is its lightweight deployment in potentially large and heterogeneous enterprise environments. This is facilitated by leveraging the conventional TCP/IP network infrastructure and protocols for connectivity monitoring, while innovatively using existing data sources and processes for system calibration.

Furthermore, by employing network connectivity monitoring techniques which are independent of target device instrumentation, the target scope of localization includes unauthorized devices and virtual machines. At the same time, the system is extensible to exploit managed devices (e.g., with installed software agents) to increase calibration and estimation precision in providing location information.

Finally, by introducing an ontology (i.e., spatial hierarchies) to semantically describe the enterprise location space, we achieve the capability to share and combine location information on different levels of granularity, dynamically adjust to the best location granularity available, and support enhanced data analysis and interoperability.

The system is independent of the availability, completeness and accuracy of existing network topology documentation—though when available, such documentation can be imported to support calibration and to be verified against the mapping knowledge acquired during calibration.

In the following description, we will start with a first simple example, then generalize to a broader understanding of topology elements and the concept of mapping confidence on another example, to then explain a realization with its algorithms.

A. First Example

Figure 1A:
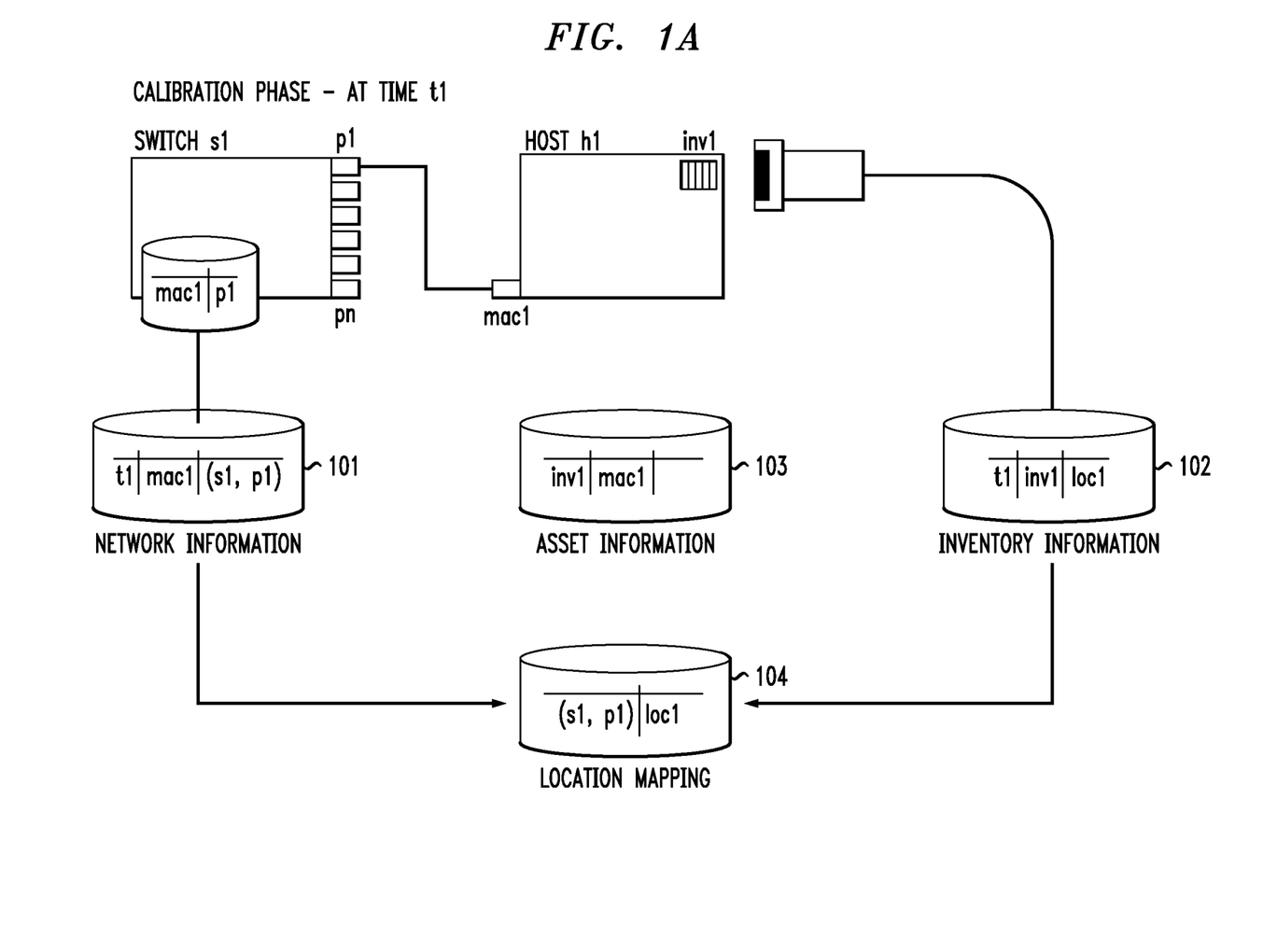
FIG. 1A shows a calibration phase according to an embodiment of the invention.

Let us consider a first example. FIG. 1A shows a learning or calibration phase according to an embodiment of the invention. Specifically, we consider a host h1 having the following attributes: inventory number inv1, network address mac1 and physical location loc1. At a particular time t1, this host is connected over its network interface card and Ethernet cable to the network infrastructure. On the infrastructure side, the Ethernet cable (it may be attached to an outlet which represents the unknown building cabling including potential patch panels) eventually attaches h1 to port p1 of switch s1. The switch s1 keeps a mapping entry which associates mac1 with p1. This mapping is needed by the network infrastructure to direct inbound traffic to host h1. An observer can extract this information from s1, e.g., with the help of SNMP (Simple Network Management Protocol). Hence, we obtain the following information (101): (t1, mac1)→(s1, p1).

Let us assume that at about the same time, host h1 is also captured during a physical inventory of IT assets. Capturing can be performed with the help of a standard electronic bar code scanner which records the inventory number inv1 along with the location loc1 at time t1. This inventory record can be summarized as (102): (t, inv1)→loc1.

To properly combine the network and inventory information, i.e., to combine (101) and (102), we need to link the two identifiers inv1 and mac1. The required mapping is typically contained in some asset purchasing or configuration database (103): inv1→mac1. This leads to the formula (104): (s1, p1)→loc1, which states that we expect devices connected to s1's port p1 to be located at loc1 at time t1, but probably also for some time into the future.

Figure 1B:
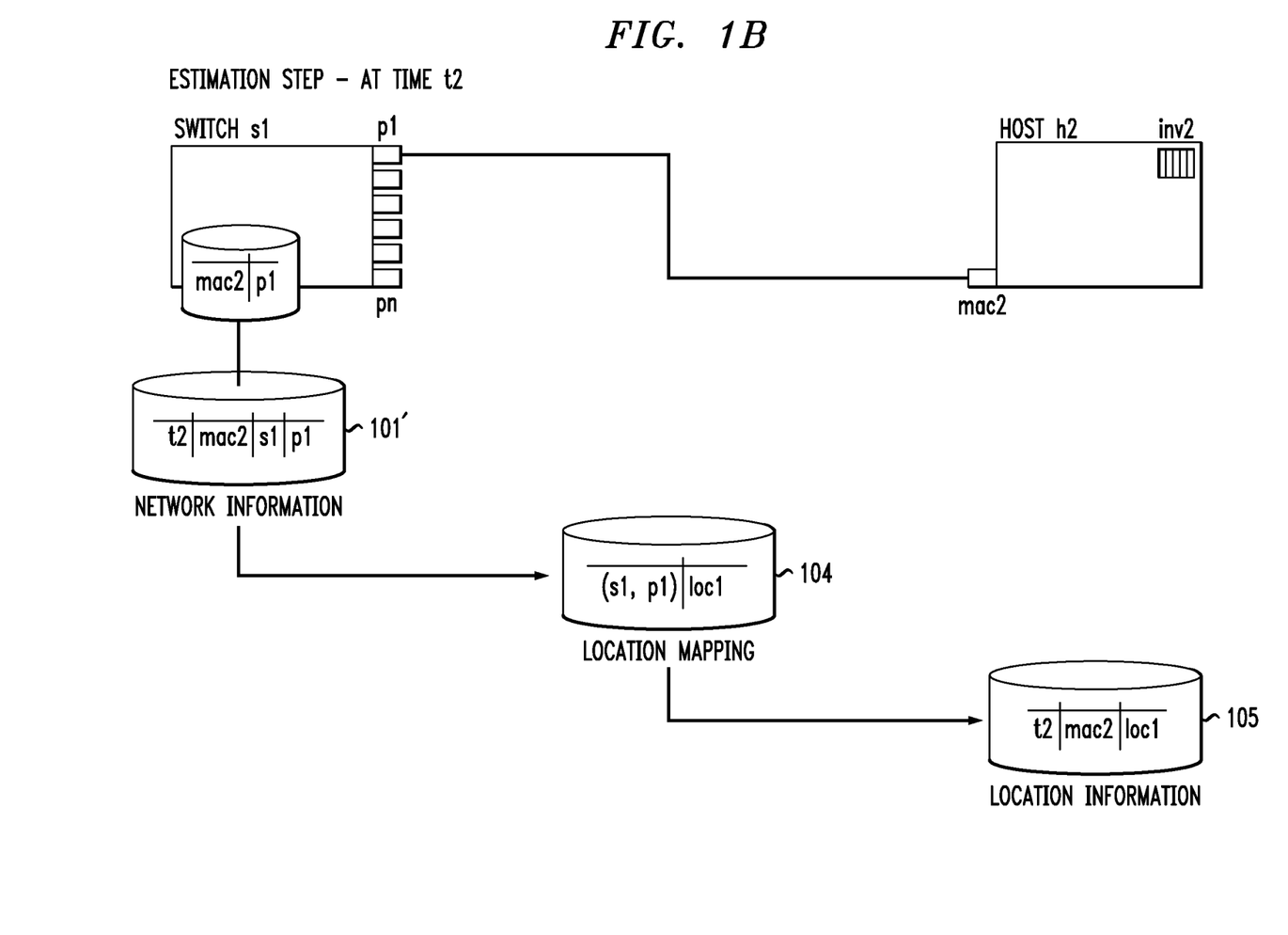
FIG. 1B shows an estimation phase according to an embodiment of the invention.

So FIG. 1B shows the exploitation of the gathered information during the lookup or estimation step, assumed at time t2>t1, according to an embodiment of the invention. It could be that host h1 has been relocated to a different location. In any case, a different host h2 is assumed to now be observed on the same switch port by (101') (t2, mac2)→(s1, p1). So formula (104): (s1, p1)→loc1 can be applied to draw a conclusion on the location of h2, leading to the insight (105): (t2, mac2)→loc1.

In general, we may consider lookups using formula (104) valid to learn the location information of devices if: (a) port p1 is patched to and used by devices in a distinct location, which is true for common micro segmented access level networks and; (b) the patching does not change as dynamically as the expected roaming of the devices.

B. Generalization

Topology Elements and Mapping Confidence

In a next step, we abstract from concrete concepts like MAC (media access control) address, switch port and Ethernet cable as used in the above example. Instead, we consider arbitrary host network attributes, fixed topology elements, and associations between them. This generalizes the terms introduced in the first example to the following concepts:

Topology elements (top*)—such as switch ports, switches, routers and gateways, wireless access points, wireless networks, subnets, network domains and virtual LANs (VLANs);

Host network attributes (n*), such as MAC addresses, static/dynamic IP addresses, DNS (domain name server) hostnames, default gateways, or other attributes describing locational categories of devices; and Host-attribute to topology-element associations. This relationship is of the many-to-many type, in particular when using multiple networks, interfaces, and attributes.

In general, a topology element does not necessarily relate to one distinct physical location (as assumed in the initial example). Instead of maintaining a single location record for each topology element, we track the historic dimension of all observations, while incrementally computing the topology-element to location mapping confidence. This facilitates storing different location indications including conflicts, while enabling optimal heuristic location determination. During the calibration phase, we perform an incremental calibration by collecting observed locations and evaluating the location consent for each new observation. The goal of this calibration is to learn and automatically identify topology elements that yield high location consent and hence qualify for location inference. The location consent is described by a location identifier (which is defined in a semantic spatial model or SSM) and a confidence value (in the range 0:100%) which is determined by a "semantic location voting" (SLV) algorithm which will be introduced below.

The success of calibration depends on the actually tracked physical and logical network layout. Large scale enterprise networks which comply with network design guidelines (such as the structured cabling standard which is proposed by TIAIEIA-568-B) would favor location inference from topology elements. For example, switch ports may directly map to a single office, switch components may serve a single floor, all hosts within a floor may be within the same subnet, all hosts within a building may share the same default gateway, etc. By adaptively calibrating to the implemented network layout, we are even able to cope with deviations and exceptions to implemented norms. This gives good yield despite many ad-hoc deployments (only loosely following architectures) and the lack of up-to-date deployment documentation (which is anyway so difficult to obtain).

Figure 2A:
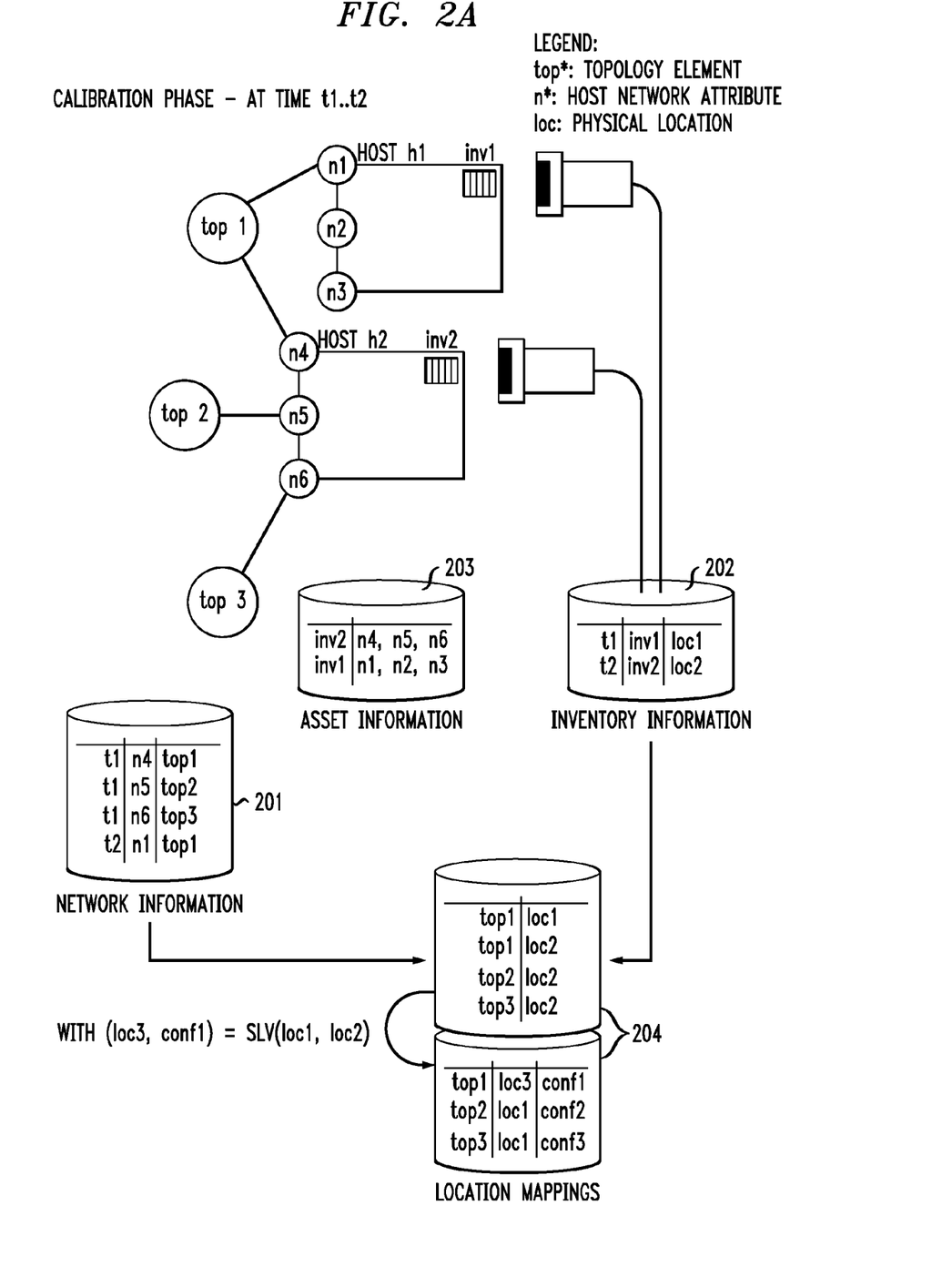
FIG. 2A shows a calibration phase according to another embodiment of the invention.

FIG. 2A shows a generalized calibration phase according to an embodiment of the invention. In this example, two inventory record location observations (202) are integrated with three topology elements (top1, top2, top3) using network information (201) and asset information (203) analogous to the initial example. As a difference, top1 is found to be associated to two devices in two different locations (loc1 and loc2). Now, instead of replacing the location mapping for top1 during the sequential processing of inventory records, we store any observed location for top1 and apply the SLV algorithm (explained in the following) in order to determine the consenting location (loc3) and a confidence metric (conf1). Hence, we generally do not assume topology elements to relate to distinct locations as in the above example.

Figure 2B:
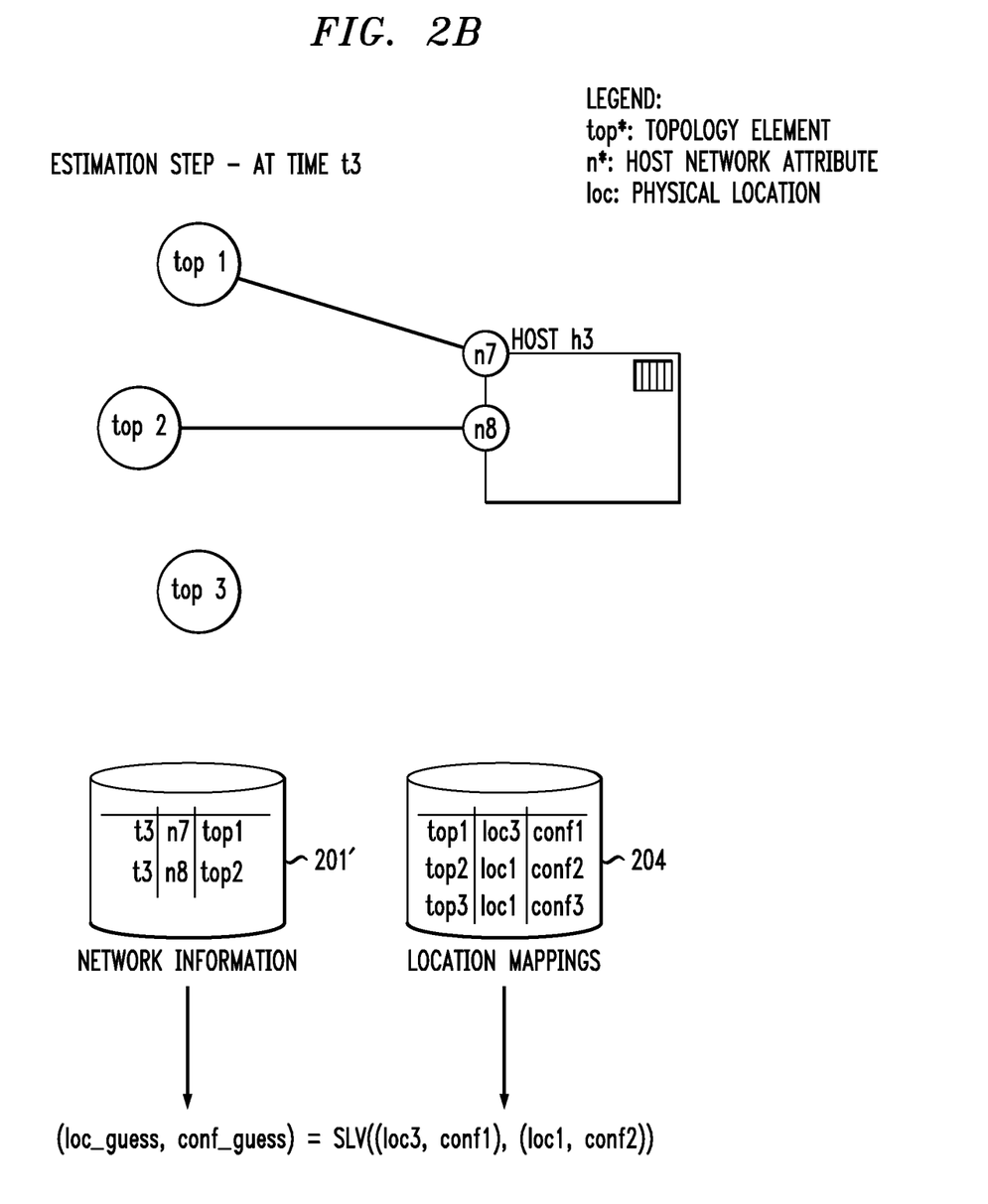
FIG. 2B shows an estimation phase according to another embodiment of the invention.

FIG. 2B shows a generalized estimation step according to an embodiment of the invention. The location mappings (204) produced by the calibration phase are used to guess the physical location of arbitrary network devices in a way that high confidence mappings dominate low confidence mappings. For this purpose, we attempt to identify any associated topology element for the target device (201') and then determine the location consent of any applicable mappings (204) with the help of the SLV algorithm. In this estimation step, the SLV algorithm considers the heterogeneous confidence of location mappings in a weighted voting. In practice, calibration and estimation steps can be performed interweaved concurrently.

C. Realization

In order to realize the described behavior, we utilize two core functional components:

An IT asset configuration and network connectivity model (CCM) which is continuously updated through network monitoring techniques, enabling the combination of topology and location information during calibration and estimation phases; and A semantic spatial model (SSM) of enterprise locations, enabling the combination of multiple location findings during calibration and estimation phases.

1. Configuration and Connectivity Model (CCM).

The first pillar of the location system is a continuously updated model of network device to topology element associations. The more accurate and complete the CCM information, the more efficient calibration and location estimation, both gaining robustness and confidence. Therefore, besides employing conventional network monitoring techniques from the network infrastructure side (SNMP), we also use target device side software agents to update locally observed network attributes. This model can be queried for physical and logical associations between target devices and topology elements. Further, model transformations are persisted in a change log, to enable historic state queries.

2. Semantic Spatial Model (SSM).

The SSM serves to: (i) define and refer to physical locations; (ii) describe location relationships and meta-data; and (iii) decide on the conformity of two semantic location findings of possibly heterogeneous granularity and confidence.

The latter capability is required when multiple location findings are returned during calibration or estimation phases.

An SSM ontology defines a location relationship type which expresses location containment. One location S is wholly contained within another location T, i.e., a subset or sublocation of T. Mathematically, this can be expressed as $S \subset T$ and translates to $\forall$ Position p $(p \in S) \rightarrow (p \in T)$ in terms of set membership. Hence, with containment relationships, we can derive the assumption that $p \in T$ provided the assertion $p \in S$.

The containment relationship organizes locations into an hierarchical tree structure. Tree nodes having the same depth within this tree are considered locations on the same granularity. Containment relationships are only expressed between locations of granularity level n to those of level n+1 with $0 <= n <= depthmax$, since the containment relationship is transitive.

From a deployment perspective, the SSM has to be initially provided at system setup. Since enterprise locations typically conform to systematic naming schemes, in many cases, it is possible to generate the SSM, e.g., from a list of room names, by providing a template which indicates which part of the room name has which hierarchical meaning. This way the SSM can be populated with locations on the granularity levels site, building, floor and room.

We express the SSM itself by using the W3C Resource Description Framework (RDF) and the SSM ontology with the W3C Web Ontology Language (OWL) languages. Since both languages are semantic web standards, we facilitate the integration of location system client applications.

3. Semantic Location Voting Algorithm (SLV)

A major capability of the proposed localization system is to integrate multiple location findings of heterogeneous granularity and confidence. The following section describes how we achieve such integration.

Two location findings loc1 and loc2 with granularity(loc1) <granularity(loc2) are conforming if location loc1 is on the root path of loc2. Else, loc1 and loc2 are considered conflicting findings. The consent of two conflicting findings loc12 is the common node on the root path having the highest granularity level. In the worst case, loc12 equals the SSM's root node. The latter entails all other locations and hence can be interpreted to contain all objects of unknown location.

In order to integrate multiple location findings, the previously described tree constitutes the data structure upon which a voting algorithm is executed. Each location finding constitutes a vote for the identified location node, and additionally a vote for all nodes on the root path. For an unweighted voting, each vote increments a node counter for each node. To consider heterogeneous confidence, the increment may be different from one. Either way, after all findings are applied to the tree structure, the root node shows the highest rating r(root). Then all node ratings are normalized with the same factor Vr(root). By recursively selecting the strongest rating of child location nodes, starting from the root node, the strongest branch is determined. This branch displays for each granularity level a rating r(x), with r(root)=1 at top (highest rating, lowest granularity) and the highest granularity and lowest rating r(n) at bottom.

Figure 3:
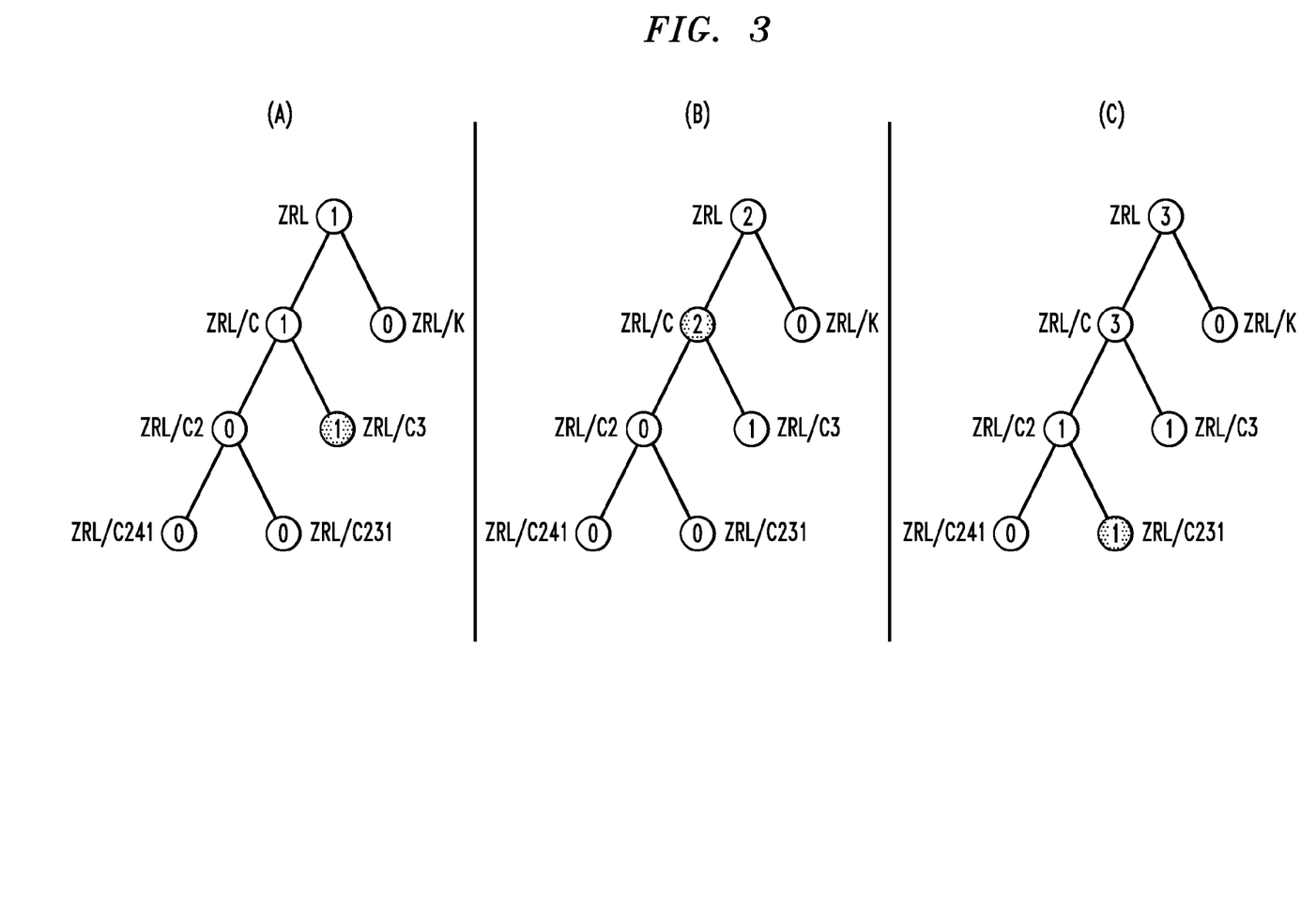
FIGS. 3A through 3C show examples of spatial hierarchical structures according to an embodiment of the invention.

As shown in FIGS. 3A through 3C, a particular topology element top1 may be associated with different location nodes in the spatial model over time, and in particular with each new location finding being processed. Consider an initial location finding loc1='ZRL/C3' (IBM Zurich Research Laboratory, C Building, Third Floor) being processed for the association rule of (top1, loc1), see FIG. 3A. A target element associated with topology element top1 is then considered to be on the Third Floor. Assume that a subsequent location finding being processed associates the same topology element top1 with loc2='ZRL/C2' (Second Floor), then the semantic location voting algorithm will lead to updated ratings, essentially electing the common parent location of loc1 and loc2, i.e., loc3='ZRL/C' (meaning: somewhere in C Building) as the new strongest rating, see FIG. 3B. With yet another in this very specific location finding loc4='ZRL/C241', the generalization is again reverted, strong confidence being established along the 'ZRL/C2' branch ("despite conflicting floor information the Second Floor is more likely") all the way to the single office (i.e., 41 on the Second Floor), which at the end has the highest rating, see FIG. 3C.

D. Calibration Sources

Whenever we externally observe the physical location of a device, we are able to use this information for localization system calibration once we manage to identify the device in the CCM. With respect to dynamic network addressing mechanisms (and changing device configurations) for a successful combination, we need to provide at least one of the sample device's network identifiers which is/was valid during the observation. The CCM change log enables integration of historic observations. Each SLV integration yielding a conforming location different from root creates or updates a location mapping for each known associated topology element.

In order to avoid extensive effort in location system deployment, we propose three augmenting approaches to leverage existing data or processes for system calibration.

1. Location Knowledge Captured During Physical Inventories.

The physical location and time of sighting are obligatory attributes of inventory records. These records are captured typically with the help of bar-code scanners during a systematic screening of enterprise locations. With the help of the CCM's change log, the historic connectivity of an IT asset can be combined with the location entailed in the inventory record, once it is possible to map the inventory identifier (as encoded in the bar-code) to a valid network identifier (such as a static hostname). The latter mapping can be extracted from a Configuration Management Database (CMDB). From the hostname, dynamic IP and physical MAC address identifiers can be derived with the help of Domain Name Server (DNS) logs and the Address Resolution (ARP) protocol caches.

2. Location Knowledge as Demographically Declared.

Social software applications (e.g., instant messaging systems) typically provide contextual user information such as the availability and current location. Typically, the location context is initially declared by users and recognized through local network connectivity profiles. We propose the statistical use of user-declared locations for localization system calibration, turning the location aware application into a software agent. This agent provides along with each user location declaration the locally observed network identifiers and attributes towards our location system, thus enabling a combination of the location finding with the current CCM state. In turn, the client application can use the system for granular location estimation. The low confidence of individual declarations can be compensated by plausibility checks and demographic statistical averaging.

3. Location Knowledge as Derived from Behavioral Patterns.

Network devices that predominantly access the local area network from particular home locations offer yet another calibration approach. Personal workstations that are most frequently used in an employee's (fixed) office location fall into this category. Without the need of knowing a distinct, current or historic device location as in the proposals before, by performing a long-term analysis on the asset's connectivity in order to identify a home location connectivity scenario, a combination can also be performed. This combination requires: (i) the existence and possible identification of a "home connectivity scenario;" knowledge on the IT asset's network configuration as well as the asset owner; and knowledge on the owner's fixed office location (employee database).

Each of the proposed calibration sources (1 through 3) yields partial topology element to location mapping data, each with a distinct level of confidence. In order to combine all sources for more efficient localization system calibration, the heterogeneous confidence inherent to those techniques can be considered by the SLV in the form of confidence factors.

E. Target Device Location Estimation Algorithm

Figure 4:
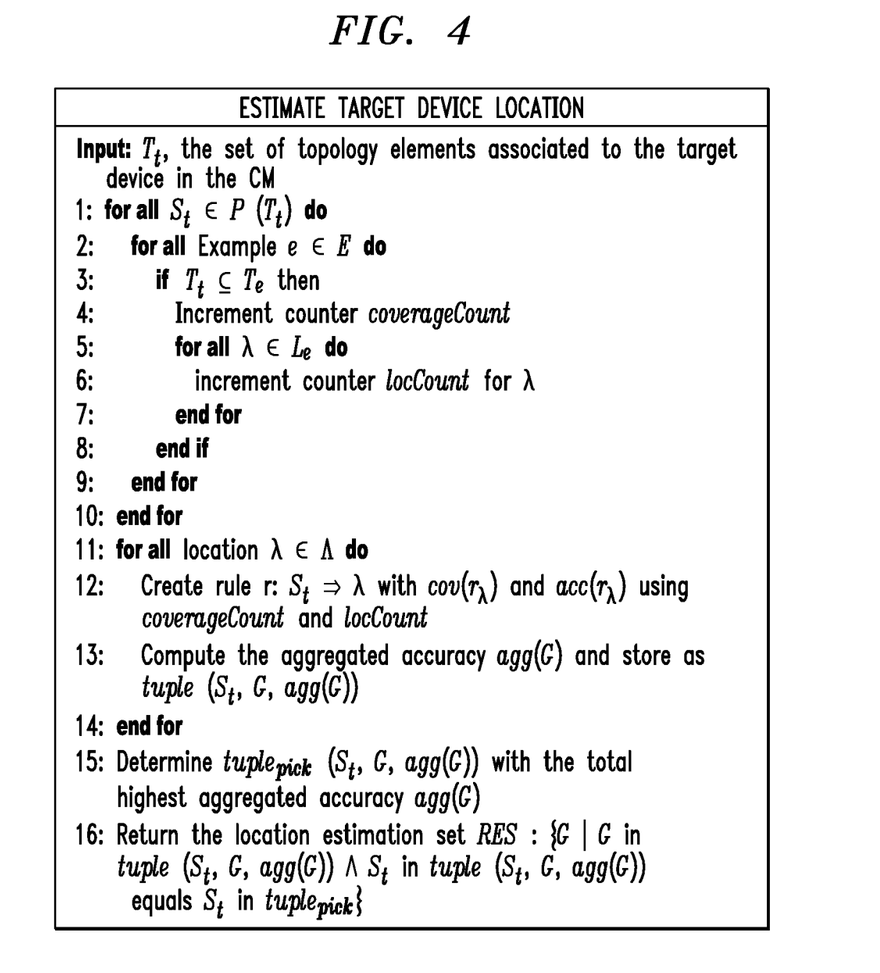
FIG. 4 shows pseudo code for a methodology for estimating target device location according to an embodiment of the invention.

FIG. 4 shows pseudo code for a methodology that implements the above-described calibration and estimation principles.

An adaptive learning algorithm identifies mappings between the topology elements in set $\Theta$ defined by the CCM and locations in set A defined by the SSM. Historically observed device locations constitute the algorithm's training set which is used to calibrate to the unknown network environment. A number of training data sources are discussed above. From each source, we extract a set of examples, where each example:

$$e:(T_e,L_e) \in E.$$

associates a set of topology elements $T_e \subset \Theta$ with a set of locations $L_e = \{\lambda \mid \lambda \in \Lambda, \lambda \text{ isImpliedBy}(\overline{\lambda_{leaf}})\}$. $T_e$ comprises any topology element associated to the example device according to the CCM, and each location in $L_e$ is on the root path of the observed location $\lambda_{leaf}$ in the SSM. The training set E is subsequently used for system calibration.

Location estimation is based on association rules. Association rules are a common concept in data mining. They express regularities underlying a dataset and can be used for prediction.

The unknown location $L_t$ of a target device t is estimated by its associated topology element set $T_t$.

$$t:(T_t,L_t)$$

$T_t$ and $L_t$ are defined analog to $T_e$ and $L_e$. For our purpose, we define a set of association rules R, where each rule:

$$r: S_t \Rightarrow \lambda, S_t \in P(T_t), \lambda \in \Lambda$$

predicts from a topology element set $S_t$ a semantic location $\lambda$ in the SSM.

Before explaining the algorithm, we introduce a number of definitions related to association rules:

1) The coverage (or support) of an association rule is defined as the number of instances for which its prediction is correct. The training set produced by the examples yields, for each rule, a coverage:

$$cov(r) = |\{e | e \in E, S_t \subseteq T_e \wedge \lambda \in L_e\}|.$$

The coverage is computed by counting the occurrences of each location in $L_e$ of those examples having a superset of $S_t$ on the left-hand side.

2) The accuracy of an association rule is defined as the number of instances the rule predicts correctly (which is the coverage), expressed as a portion of all instances to which it applies. In our context, this translates to:

$$acc(r) = \frac{cov(r)}{|\{e \mid e \in E, S_t \subseteq T_e\}|}.$$

The denominator is the number of occurrences of $S_t$ on the left-hand side of E.

For one given $S_t$, there are $2^n * |\Lambda|$ rules, each having a coverage and accuracy metric. A location estimation is a set of rules predicting locations on the same root path:

$$G(\lambda_{leaf}) := \{r: S_t \Rightarrow \lambda \mid r \in R, \lambda \text{ isImpliedBy}(\lambda_{leaf})\}.$$

We define the aggregated accuracy of G as:

$$agg(G) \sum_{r \in G} acc(r).$$

Based on these above definitions, we use the algorithm shown in FIG. 4 for target device location estimation.

In theory, it is possible to precompute all association rules for any possible combination of CCM topology elements when the training set is updated. However, it may be practically infeasible to compute the powerset of a large set of topology elements and execute the above algorithm for each subset. Consequently, we can delay the computation until estimation time and only consider topology elements which are actually associated to the target device. This yields an estimation overhead that scales linearly with the size of the training set.

Figure 5:
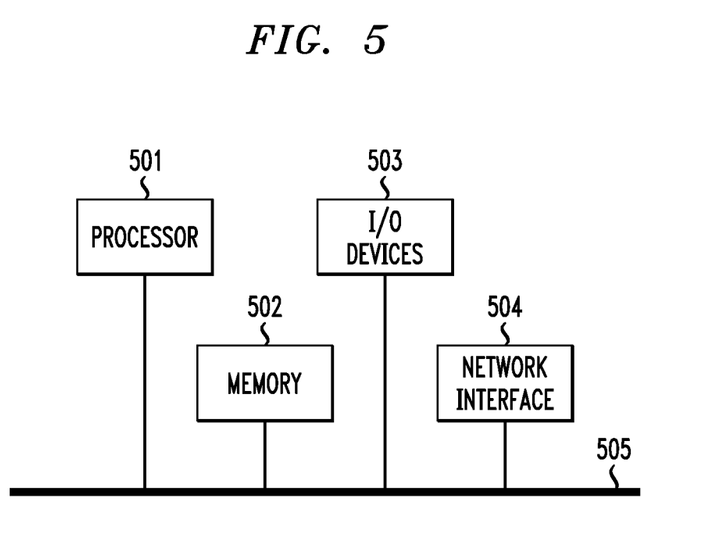
FIG. 5 shows a computer system in accordance with which one or more components/steps of the techniques of the invention may be implemented.

F. Illustrative Computer System for Executing Target Device Location Estimation Lastly, FIG. 5 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 5 may represent one or more servers or one or more other processing devices capable of providing all or portions of the functions described herein. Alternatively, FIG. 5 may represent a mainframe computer system.

The computer system may generally include a processor 501, memory 502, input/output (I/O) devices 503, and network interface 504, coupled via a computer bus 505 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for determining a location of a target element in a distributed network, comprising the steps of:

associating one or more physical locations of network components in a distributed network to one or more sample topology elements, wherein the topology elements form a network infrastructure of the distributed network to which the network components are connected, wherein the topology elements comprise one of switches, routers, access points, logical subnets and domains or other logical or physical elements that define the network infrastructure;

generating location mappings, the location mappings representing associations between the physical locations of network components associated with the one or more sample topology elements and one or more network attributes, wherein generating location mappings comprises tracking historical associations between physical locations of network components and one or more sample topology elements and using a voting algorithm to incrementally compute location confidence measures for respective sample topology elements that have more than one physical location associations with network components; and estimating a location of a target network component using the location mappings and the incrementally computed location confidence measures.

2. The method of claim 1, wherein the associating step is performed in accordance with one or more network monitoring techniques.

3. The method of claim 2, wherein the one or more network monitoring techniques comprise capturing location knowledge using one or more of: (i) a physical inventory; (ii) a demographic declaration; and (iii) a behavioral pattern.

4. The method of claim 1, wherein when the sample topology element has more than one physical location of network components associated therewith, the physical location of the network component with the highest confidence measure is selected as the physical location of the sample topology element.

5. The method of claim 1, wherein the estimating step comprises the steps of:

determining the existence of an association between the target network component and at least one of the sample topology elements; and identifying the physical location of a network component associated with the sample topology element as the location of the target network component associated therewith based on a confidence measure computed for the physical location of a network component associated with the sample topology element.

6. The method of claim 1, wherein the associating, generating and estimating steps are performed interweaved concurrently.

7. The method of claim 1, wherein the locations of the sample topology elements and the estimated location of the target network component are represented by a spatial hierarchical structure.

8. The method of claim 7, wherein the spatial hierarchical structure enables evaluation of location determination on different levels of granularity.

9. Apparatus for determining a location of a target element in a distributed network, the apparatus comprising:

a memory; and a processor coupled to the memory and operative to:

associate one or more physical locations of network components in a distributed network to one or more sample topology elements, wherein the topology elements form a network infrastructure of the distributed network to which the network components are connected, wherein the topology elements comprise one of switches, routers, access points, logical subnets and domains or other logical or physical elements that define the network infrastructure;

generate location mappings, the location mappings representing associations between the physical locations of network components associated with the one or more sample topology elements and one or more network attributes, wherein generating location mappings comprises tracking historical associations between physical locations of network components and one or more sample topology elements and using a voting algorithm to incrementally compute location confidence measures for respective sample topology elements that have more than one physical location associations with network components; and estimate a location of a target network component using the location mappings and the incrementally computed location confidence measures.

10. The apparatus of claim 9, wherein the location associating operation is performed in accordance with one or more network monitoring techniques.

11. The apparatus of claim 10, wherein the one or more network monitoring techniques comprise capturing location knowledge using one or more of: (i) a physical inventory; (ii) a demographic declaration; and (iii) a behavioral pattern.

12. The apparatus of claim 11, wherein when the sample topology element has more than one physical location of network components associated therewith, the physical location of the network component with the highest confidence measure is selected as the physical location of the sample topology element.

13. The apparatus of claim 9, wherein the estimating operation comprises determining the existence of an association between the target network component and at least one of the sample topology elements, and identifying the physical location of a network component associated with the sample topology element as the location of the target network component associated therewith based on a confidence measure computed for the physical location of a network component associated with the sample topology element.

14. The apparatus of claim 9, wherein the associating, generating and estimating operations are performed interweaved concurrently.

15. The apparatus of claim 9, wherein the locations of the sample topology elements and the estimated location of the target network component are represented by a spatial hierarchical structure.

16. The apparatus of claim 15, wherein the spatial hierarchical structure enables evaluation of location determination on different levels of granularity.

17. An article of manufacture for determining a location of a target element in a distributed network, the article comprising a non-transitory computer readable tangible storage medium including one or more programs which when executed by a computer system perform the steps of:

associating one or more physical locations of network components in a distributed network to one or more sample topology elements, wherein the topology elements form a network infrastructure of the distributed network to which the network components are connected, wherein the topology elements comprise one of switches, routers, access points, logical subnets and domains or other logical or physical elements that define the network infrastructure;

generating location mappings, the location mappings representing associations between the physical locations of network components associated with the one or more sample topology elements and one or more network attributes, wherein generating location mappings comprises tracking historical associations between physical locations of network components and one or more sample topology elements and using a voting algorithm to incrementally compute location confidence measures for respective sample topology elements that have more than one physical location associations with network components; and estimating a location of a target network component using the location mappings and the incrementally computed location confidence measures.

18. The article of claim 17, wherein the locations of the sample topology elements and the estimated location of the target network component are represented by a spatial hierarchical structure.

* * * * *